Aug. 24, 1965   G. W. SCHAUER, JR   3,202,798
DOMESTIC ELECTRIC APPLIANCE
Filed Aug. 9, 1962                                    2 Sheets-Sheet 1

INVENTOR.
George W. Schauer, Jr.
BY Lloyd M. Keighley.
HIS ATTORNEY

Aug. 24, 1965  G. W. SCHAUER, JR  3,202,798
DOMESTIC ELECTRIC APPLIANCE
Filed Aug. 9, 1962  2 Sheets-Sheet 2

INVENTOR.
George W. Schauer, Jr.
BY
Lloyd M. Keighley.
HIS ATTORNEY

United States Patent Office 3,202,798
Patented Aug. 24, 1965

3,202,798
DOMESTIC ELECTRIC APPLIANCE
George W. Schauer, Jr., Dayton, Ohio, assignor to General Motors Corporation, Detroit, Mich., a corporation of Delaware
Filed Aug. 9, 1962, Ser. No. 215,945
8 Claims. (Cl. 219—413)

This invention relates to domestic appliances and particularly to cooking ovens.

Manufacturers of ranges provided with thermostatically controlled cooking ovens have encountered a perplexing and expensive service problem where the calibration of the oven heat in a range differs from that in the range it replaces. The problem may exist because a housewife beginning to use a newly purchased range had for many years past cooked or baked food products in her old oven wherein the control for the heater thereof was not properly calibrated to indicate the correct oven temperature. The housewife therefore notices that food products placed in her new oven are not cooked or baked properly in the same length of time she had been accustomed to in using her old oven. This results in a call to the dealer and a trip by a service man to her residence whereupon the service man checks the calibration of the oven heater switch with temperature markings on the switch control and informs the housewife that all elements of the oven are correctly calibrated and marked. The service man's trip is costly to the dealer and under this instant circumstance several such trips, inspection and checking may be required before the housewife is assured that her new oven will cook or bake at the temperatures indicated on the oven control. Such assurance may not be convincing to the housewife since it necessitates a change in cooking habits to which she has been accustomed.

Accordingly, an object of my invention is to provide an improved arrangement for controlling oven temperatures which will give the housewife an auxiliary control in addition to the factory preset calibrating means to alter slightly the factory calibration of her oven thermostat.

Further objects and advantages of the present invention will be apparent from the following description, reference being had to the accompanying drawings wherein preferred embodiments of the present invention are clearly shown.

Figure 1:
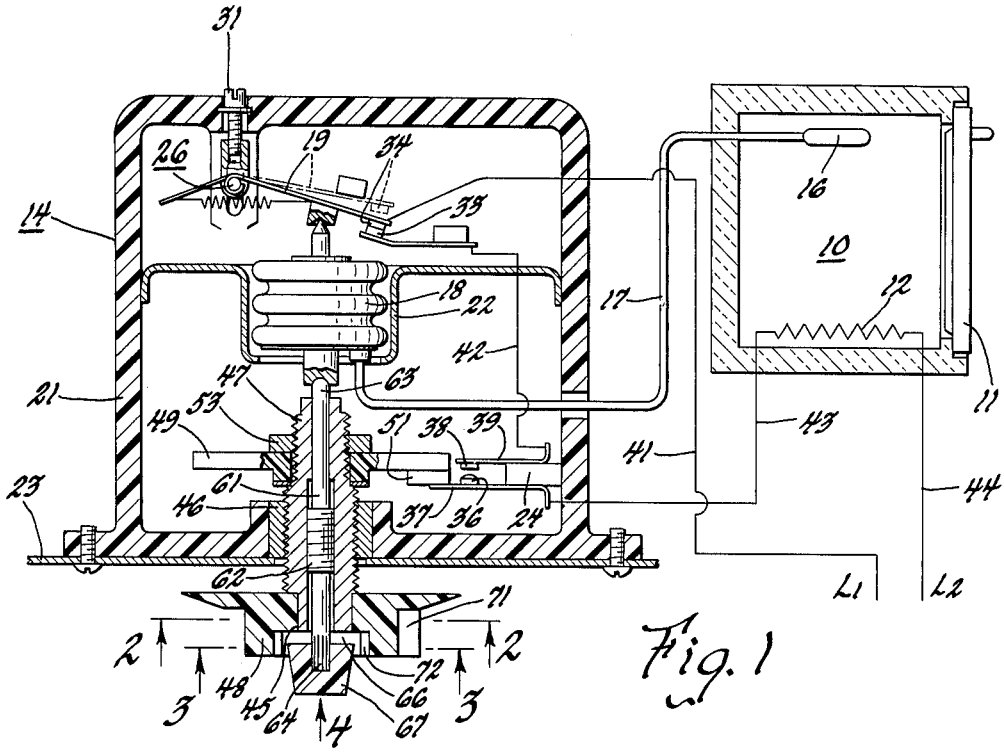
FIGURE 1 is a schematic and diagrammatic view showing a cooking oven having my invention associated with a heater therein.

Referring to the drawings, for illustrating my invention, I show in FIGURE 1 thereof an insulated cooking oven chamber 10 which may be mounted in a wall or which can be incorporated in a free standing range having an access opening normally closed by a door 11. A heater 12, which may, although not necessarily, be of the electric resistance type, is located in oven 10 and is connected, through a regulator or thermostatic control schematically represented at 14, to a source of energy such as an electric current supply indicated at $L_1$ and $L_2$. A sealed fluid containing thermally responsive unit including a bulb 16 located within thermostat 14 is employed to selectively actuate an electric switch 19 in series electrical flow relationship with the heater 12. The thermostat 14 includes a molded plastic casing 21 having a support means such as a bracket 22 for mounting the bellows 18 of the thermal unit in the casing. Casing 21 is mounted outside oven 10 preferably on a control panel thereof, represented at 23, so that adjustable knobs or the like associated with the thermostat 14 are readily accessible by the user of the oven exteriorly thereof. The sealed thermally responsive unit when activated, by energizing heater 12, causes expansion and contraction of bellows 18 to operate the switch 19.

Thermostat 14 is provided with a factory calibrating means 26 which is normally inaccessible to the user of the oven 10 and preset at the factory to calibrate the thermostat for different heat outputs of heater 12 within the oven. Such calibrating means can take many forms and is shown merely for illustration as an adjustable over-center toggle switch 19 which carries a contact 34 adjustable relative to the bellows 18 by a factory preset screw 31 and shiftable into and out of engagement with the fixed contact 33 by the thermally responsive movement of the bellows 18.

A main line switch generally represented by the reference numeral 24 is incorporated in the thermostat 14 and is actuated by rotation of an adjustable shaft of the thermostat in a manner to be hereinafter described for conditioning heater 12 for energization when the oven is in use. The main line switch 24 for purposes of illustration includes a contact 36 mounted on a movable spring arm 37 thereof and a contact 38 mounted on an arm 39 which contacts are normally open or separated from one another and closed in a manner to be hereinafter described. A wire 41 leads from the source of heat energy or electric current supply line $L_1$ to movable contact 34 of switch 19, a wire 42 leads from stationary contact 33 of switch 19 to arm 39 and contact 38 of switch 24 and another wire 43 leads from arm 37 and contact 36 of switch 24 to one end of heater 12. Still another wire 44 leads from the other end of heater 12 to the source of heat energy or electric current supply line $L_2$.

Figure 2:
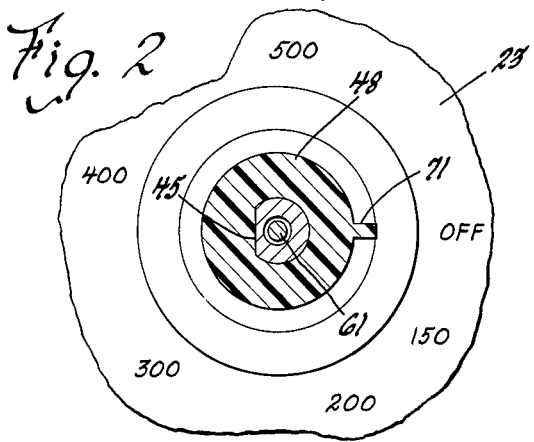
FIGURE 2 is a sectional view taken on the line 2—2 of FIGURE 1 showing knobs on the control associated with indicia provided on a panel adjacent the knobs.

Thermostat casing 21 is provided with a threaded means such as a metal insert 46 molded in a wall thereof which adjustably receives a hollow shaft 47, threaded both internally and externally, projecting outwardly beyond panel 23 and has a plastic knob or the like 48 keyed to its outer end as at 45 (see FIGURES 1 and 2). Shaft 47 carries any switch actuating means such as a nonmetallic disk-like member 49 having a cam 51 formed thereon for immediately closing contacts 36 and 38 of this switch when knob 48 is rotated. A nut 53 threaded on shaft 47 locks member 49 thereon and coordinates or permits adjustment thereof relative to knob 48 and switch 24. Thermostat 14 and parts thereof thus far described are fundamental elements of conventional controls now in use on ranges or ovens to energize the oven heater and adjust its heating output at predetermined rates according to different ones of a plurality of stations into which the knob 48 is rotated and positioned so as to heat the oven and establish unlike selected temperatures therein. The conventional parts or elements of a control as described are well known to those skilled in the art and further elaboration of their structure or function are believed to herein be unnecessary.

Figure 3:
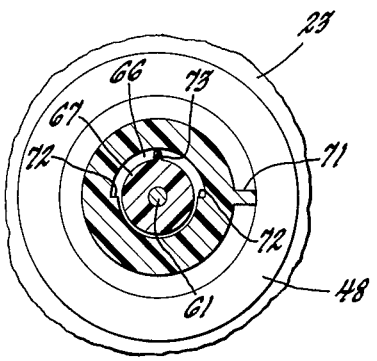
FIGURE 3 is a sectional view taken on the line 3—3 of FIGURE 1 showing nesting of the control knobs one within another.
Figure 4:
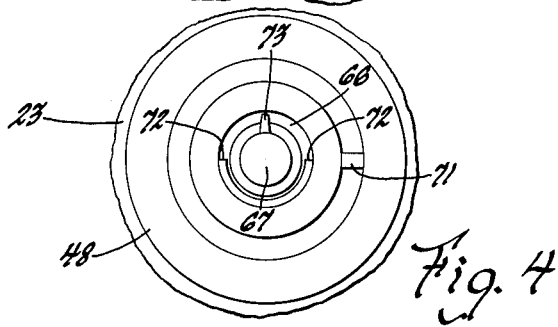
FIGURE 4 is a front plan view of the control knobs.

In accordance with my invention I modify a conventional oven regulator or control to accomplish a result which overcomes a problem heretofore explained and to provide a more diversified user control of the oven heater. In this respect it is to be noted that auxiliary means is provided in the present control for regulating, increasing and/or decreasing, the heating output of heater 12 from the predetermined rate thereof when control knob 48 is located in or rotated into any one of its adjusted stations of selected oven temperatures. This auxiliary means includes a rod 61 threaded, as at 62, into internal threads of the hollow portion of shaft 47 and having its inner end 63 bearing against or forming the connection of this shaft with the end of bellows 18 of the thermally responsive unit associated with thermostat 14. The outer end 64 of rod 61 projects beyond the outer end of shaft 47 into a hollowed out part 66 of knob 48 and is deeply knurled to receive and key or lock another smaller knob thereon. Knob 48 has a pointer 71 thereon adapted to register with indicia provided on plate 23 (see FIGURE 3) at a plurality of spaced-apart stations around the knob and into which the knob and shaft 47 are to be adjusted. Indicia shown in FIGURE 3 may, if desired, be located either on plate 23 or on the knob 48. The hollowed out part 66 of knob 48 is provided with a shouldered portion 72 (see FIGURES 1, 3 and 4) and a pointer 73 provided on knob 67 cooperates therewith whereby the shoulders 72 form stops to be engaged by the pointer for limiting rotation of knob 67 with respect to knob 48. The arangement of shaft 47 and rod 61 is such that rotation of this shaft also simultaneously rotates the rod therewith and yet rod 61 is rotatable relative to shaft 47 about the internal threads thereof. Thus a double adjusting means is provided on thermostat 14 for manually altering the action of the thermally responsive unit to vary the duration of energization and de-energization of heater 12 relative to its calibrated energization and de-energization or, in other words, to change within well defined limits the calibration of the thermally responsive unit with switch 19. This double or two-fold adjusting means is manually operable for creating different temperatures within oven 10 or for increasing or decreasing the temperature therein from a normal selected temperature when knob 48 is adjusted in any one of its stations of adjustment.

Assume that a certain food product has been inserted in oven 10 to be baked or cooked therein by a housewife who has been accustomed to cooking this type of product at a prescribed temperature and for a definite interval of time in her old miscalibrated oven. The housewife has previously been advised by a service man's call that the control for the new oven 10 is properly calibrated with temperatures produced by heater 12 in the oven and this is where my invention comes into play in order to satisfy the housewife's desire for cooking such products over a period of time to which she has been accustomed for many years. For example, the housewife after placing the product in oven 10 rotates knob 48 and pointer 71 thereon into any one of its adjusted stations corresponding with the temperature to be maintained in oven 10. Rotation of knob 48 rotates shaft 47 and member 49 thereon to move the cam 51 on this member out of engagement with spring arm 37 of switch 24 as the knob is shifted out of its "off" position. Spring arm 37 then shifts contact 36 thereon into engagement with contact 38 and completes the electric circuit from line $L_1$, through wire 41, closed contacts 33 and 34 of the switch 19, wire 42, now closed contacts 36 and 38 of switch 24, wire 43 to heater 12 and from the heater through wire 44 back to line $L_2$ for energizing the heater. The heat generated by heater 12 actuates the sealed thermally responsive unit of thermostat 14 which acts on the one switch 19 to open and close its contacts 33 and 34 intermittently in response to a raising and a lowering of the temperature respectively within oven 10 whereby heater 12 maintains the oven at a selected temperature substantially corresponding to the temperature indicated at the adjusted station of adjustment of pointer 71 on knob 48. Here it is to be understood that since bulb 16 of the thermal unit is calibrated, by the factory preset means, it is responsive to an increase in temperature within oven 10 above that to normally maintain same at a predetermined selected temperature and causes expansion of bellows 18 to open contacts 33 and 34 of switch 19 to momentarily de-energize heater 12 and permit a cooling or cool down period of the oven whereupon contraction of bellows 18 occurs and springs 32 of switch 19 then closes the switch contacts 33 and 34 to again energize the heater. If the period of time of cooking the product in oven 10 is more or less than that accustomed to by the housewife she may rotate the small knob 67 in either direction to bring the pointer 73 thereon into engagement with a stop or shoulder 72 to thereby decrease or increase the duration of energization of heater 12 to maintain a higher or lower temperature in oven 10 and consequently cook the product therein during an interval of time corresponding to her established custom. Rotation of small knob 67 relative to large knob 48, while same is adjusted into any one of its stations, threads rod 61 along the threads 62 within shaft 47 and projects end 63 of the rod farther into and/or outwardly of casing 21 of thermostat 14, relative to shaft 47, for changing the location of bellows 18 with respect to switch 19 whereby the calibration of the thermally responsive unit with switch 19 is altered. This calibration alteration causes, due to a greater or lesser movement of bellows 18 required to trip switch 19, a different from normal action of the thermally responsive unit on the switch and the bellows will accelerate or retard opening and closing of contacts 33 and 34 of the switch in accordance with temperatures produced by heater 12 in oven 10 while knob 48 is adjusted into any one of its stations of adjustment. Small knob 67 may remain in its operated or rotated position relative to large knob 48 when this larger knob is rotated back into the "off" position to cause cam 51 to engage spring arm 37 and separate contact 36 of switch 24 from contact 38 thereof for opening the electric circuit and de-energizing heater 12. Limited rotation of knob 67 relative to knob 48 intermediate stops 72 thereon causes the temperature within oven 10 to be varied from the factory set temperature therein as selected by the setting of knob 48 in one of its stations. The purpose for this is to provide a means for the user to adjust easily the calibration of a range oven thermostat for a lower or higher oven temperature thus preventing a service call. The design will include stops to prevent the user from turning the calibration knob 67 over an angle of 90° clockwise or counterclockwise. The factory calibration adjustment 26 may be set at the nominal position so that the user can turn the knob 67 clockwise to lower the calibration up to approximately 35° F. and counterclockwise to raise the calibration up to approximately 35° F. By such auxiliary adjustment the oven temperatures are then varied accordingly throughout the entire range of settings of the thermostat knob 48.

The user's auxiliary calibration knob 67 is separate from the factory preset calibrating means on thermostat 14 and is operable independently thereof and of adjustable knob 48 to alter the action of the sealed thermally responsive unit on switch 19. Thus knob 67 may be operated while knob 48 is adjusted into any one of its stations to vary the duration of energization and de-energization of heater 12 relative to its regulated energization and de-energization for creating a different temperature in oven 10 from its normal temperature limits selected by adjustment of knob 48 and indicated by the indicia provided on plate 23. It should be understood that the factory calibration adjustment 26 could also be designed to operate on the bellows in substantially the same manner as the shafts manipulated by the knobs 48 and 67.

Figure 5:
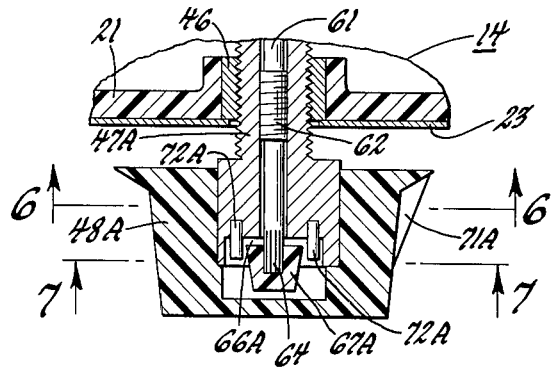
FIGURE 5 is a fragmentary sectional view of a modified arrangement of knobs for the control showing one knob fitted over and normally concealing the other knob thereof.
Figure 6:
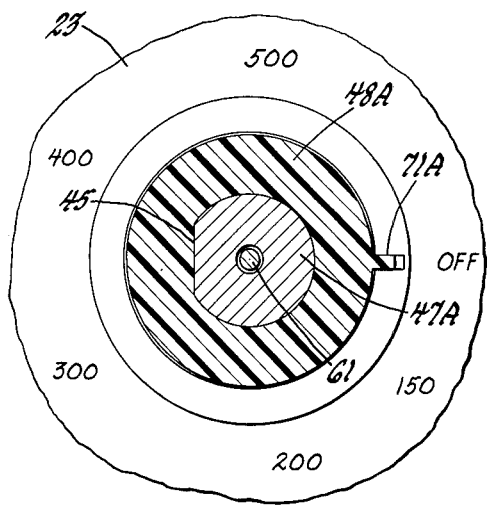
FIGURE 6 is a sectional view taken on the line 6—6 of FIGURE 5 and is similar to FIGURE 2 in that the modified knobs of the control are associated with indicia provided on a panel adjacent the knobs.
Figure 7:
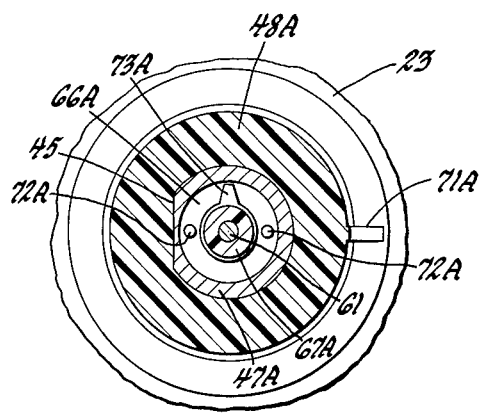
FIGURE 7 is a sectional view taken on the line 7—7 of FIGURE 5 showing one knob of the modified knob arrangement concealed within the other knob thereof.
Figure 8:
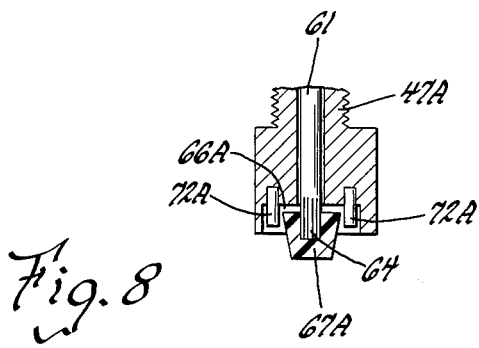
FIGURE 8 is a fragmentary sectional view similar to FIGURE 5 showing the one or outer knob of the modified knob arrangement removed from the control to provide access to the normally concealed knob.

A purchaser of oven 10 may not want advantages of the invention herein provided and may require the knob 67 to be concealed so as to prevent its accidental operation during cooking of products in the oven at a temperature selected by adjusting knob 48 into one of its stations of adjustment. I illustrate in FIGURES 5 to 10 of the drawings a fashion in which the customer's calibration altering means or knob 67 of the oven thermostat 14 may be concealed to prevent its being operated by children whereby operation thereof with intent only is available. Referring now to the modified arrangement of knobs for oven thermostat 14 it will be noted that small knob 67A (see FIGURE 5) is located in a hollowed-out part 66A formed in the outer end of shaft 47A and that stop pins 72A, corresponding to stops 72, are secured to this end of the shaft within the cavity or hollowed-out part 66A for engagement by the pointer 73A on knob 67A. The large adjustable knob 48A, keyed to shaft 47A at 45, is provided with a recessed portion, forming a continuation of the cavity 66A, in which small knob 67A is housed and concealed except when the larger knob is removed from the shaft 47A. In order to intentionally adjust knob 67A, in this modified form of my disclosure, the larger oven normal temperature selecting adjustable knob 48A may be pulled off the outer end of hollow shaft 47A to expose and render the knob 67A accessible for adjustment by the user of the oven to change the calibration of thermostat 14 whereby the action of the sealed thermal unit thereof on switch 19 may be altered for the purposes herein described.

From the foregoing it should be apparent that I have provided an improvement in oven controls which solves a perplexing problem and costly experience. In addition, my invention renders the use of an oven more versatile thereby satisfying a housewife's whimsical cooking or baking habits and also increasing the saleability of ranges or ovens. By providing a user's adjustment for easily changing the calibration of an oven thermostat within specified limits after the factory preset calibration thereof I eliminate many futile, expensive and time consuming trips of a service man in attempting to alter a particular purchaser's long established familiar or accustomed to cooking procedure.

While the embodiments of the present invention as herein disclosed constitute preferred forms, it is to be understood that other forms might be adopted.

What is claimed is as follows:

1. A controller for regulating temperature in an oven having a heater located interiorly thereof comprising:
    (a) first and second switch means for controlling energy input from a source of power to the heater within the oven,
    (b) thermally responsive means including means for sensing the oven temperature operatively associated with one of said switch means for regulating the oven temperature in accordance with temperatures sensed by said said sensing means,
    (b') a casing for enclosing said switch means and said thermally responsive means,
    (c) means for regulating said thermally responsive means including indicia means for preselecting a predetermined desired temperature at which the thermally responsive means will control the oven temperature,
    (d) calibrating means located interiorly of said casing and factory presettable to calibrate the thermally responsive means with said one of said switch means to control the oven temperature at a value corresponding to a temperature selected by said indicia means, and
    (e) auxiliary control means including stop means for varying the regulation of said thermally responsive means through a limited range determined by said stop means without changing a preselected setting of said indicia means, said auxiliary control means including a knob located exteriorly of said housing operable by manual adjustment without tools to produce a desired increased or lowered temperature within the oven on either side of the preselected temperature setting established by said indicia means.

2. The combination of claim 1 wherein the other of said switch means is controlled by said regulating means to serve as an on-off switch for the heater and wherein said one switch is operated by said thermally responsive means upon closing of said other switch means to provide a modulated control of energy to the heater varying in accordance with a temperature setting selected by said indicia means to maintain a substantially constant temperature in the oven corresponding to that set by the indicia means in the absence of manipulation of said auxiliary control means.

3. In the combination of claim 1,
    (f) said regulating means including a second knob,
    (g) said knobs being of different size with the smaller knob being located within a cavity in the larger knob,
    (h) the cavity of said larger knob being provided with stops therein for abutment by said smaller knob to limit rotation of said smaller knob for limiting the temperature modulating effect of said auxiliary control means,
    (i) both of said knobs being simultaneously moved upon adjustment of said regulating means to one of its preselectable temperature settings for maintaining a predetermined temperature differential above or below a factory calibrated temperature set by said indicia means of said regulating means and said smaller knob being movable independently of said larger knob for varying the temperature differential above or below the preset calibrated temperature setting of said indicia means.

4. The combination of claim 3 wherein said stops to be abutted by said smaller knob are on said regulating means and said larger knob thereof covers and conceals said smaller knob of said auxiliary control means and wherein said larger knob is removable from said regulating means to expose said smaller knob and thereby provide access thereto.

5. In combination:
    (a) an oven provided with an electric heater for heating the interior thereof and a control for said heater,
    (b) said control including switches and a thermal unit adapted to act on one of said switches upon energizing the heater for opening and closing same automatically in response to temperatures generated by said heater within said oven, (c) said heater being connected to a source of electric current supply through said one switch and through the other of said switches, (d) a first rotatable means associated with said control accessible from exteriorly of said oven for rotation to close said other switch for energizing said heater and activating said thermal unit, (e) said first means being adjustable into a plurality of stations during rotation thereof while said heater is energized to change the heating output thereof and establish unlike selected temperatures in said oven, (f) a second factory preset means on said control calibrating the thermal unit with said one switch thereof to regulate energization and de-energization of said heater when said first means is adjusted into a station for normally maintaining the selected temperature in said oven, (g) a third means separate from said second preset calibrating means associated with said control and accessible exteriorly of said oven, (h) said third means being mounted within said first means for rotation therewith and relative thereto engaging a portion of said thermal unit, (i) rotation of said third means within and relative to said first means with the first means adjusted into any station of said plurality of stations altering the action of said thermal unit on said one switch to vary energization and de-energization of said heater with respect to said regulated energization and de-energization thereof for creating an increase and decrease in the temperature of said oven from the temperature therein selected by adjustment of the first means, (j) a knob on said first means and a knob on said third means for manipulating them, (k) said knobs being of different size with the smaller knob on said third means located within a cavity in the larger knob on said first means, (l) the cavity in said larger knob being provided with stops therein for abutment by said smaller knob to limit rotation of the smaller knob relative to the larger knob, and (m) both of said knobs being simultaneously moved during rotation of said first means and said smaller knob being movable independently of movement of said larger knob toward the stops in the cavity thereof, (n) said stops to be abutted by the smaller knob are on the first means and the larger knob thereon covers and conceals the smaller knob on the third means and wherein the larger knob is removable from said first means to expose said smaller knob and provide access thereto.

6. A controller for regulating the temperature in an oven having a heater located interiorly thereof comprising:

(a) energy control means for controlling energy input to the heater, (b) thermally responsive means for controlling said energy control means in response to the temperature of said oven, (c) regulating means for conditioning said thermally responsive means to vary the control of said energy control means in a preselected manner including indicia means for selecting one of a plurality of temperatures, (d) means including said energy control means for factory calibrating said thermally responsive means to said energy control means to regulate the oven temperature to correspond to a temperature established by said indicia means, (e) means operatively associated with said thermally responsive means for providing an auxiliary control thereof to produce a desired raising or lowering of the temperature in said oven about a preselected temperature set by said indicia means without affecting the setting of said indicia means or the setting of said calibrating means, (f) said regulating means including a first knob, (g) said auxiliary control means including a second knob manually adjustable without tools, (h) said knobs being of different size with the smaller knob being located within a cavity in the larger knob, (i) the cavity of said larger knob being provided with stops therein for abutment by said smaller knob to limit rotation of said smaller knob for limiting the temperature modulating effect of said auxiliary control means, (j) both of said knobs being simultaneously moved upon adjustment of said regulating means to one of its preselectable temperature settings for maintaining a predetermined temperature differential above or below a calibrated temperature set by said indicia means of said regulating means and said smaller knob being movable independently of said larger knob for varying the temperature differential above or below the preset calibrated temperature setting of said indicia means.

7. The combination of claim 6 wherein said stops to be abutted by said smaller knob are on said regulating means and said larger knob thereof covers and conceals the smaller knob of said auxiliary control means and wherein said larger knob is removable from said regulating means to expose said smaller knob and thereby provide access thereto.

8. In combination:

(a) an oven provided with an electric heater for heating the interior thereof and a control for said heater, (b) said control including switches and a thermal unit adapted to act on one of said switches upon energizing the heater for opening and closing same automatically in response to temperatures generated by said heater within said oven, (c) said heater being connected to a source of electric current supply through said one switch and through the other of said switches, (d) a first rotatable means associated with said control accessible from exteriorly of said oven for rotation to close said other switch for energizing said heater and activating said thermal unit, (e) said first means being adjustable into a plurality of stations during rotation thereof while said heater is energized to change the heating output thereof and establish unlike selected temperatures in said oven, (f) a second factory preset means on said control calibrating the thermal unit with said one switch thereof to regulate energization and de-energization of said heater when said first means is adjusted into a station for normally maintaining the selected temperature in said oven, (g) a third means separate from said second preset calibrating means associated with said control and accessible exteriorly of said oven, (h) said third means being mounted within said first means for rotation therewith and relative thereto engaging a portion of said thermal unit, (i) rotation of said third means within and relative to said first means with the first means adjusted into any station of said plurality of stations altering the action of said thermal unit on said one switch to vary energization and de-energization of said heater with respect to said regulated energization and de-energization thereof for creating an increase and decrease in the temperature of said oven from the temperature therein selected by adjustment of the first means, (j) a knob on said first means and a knob on said third means for manipulating them, (k) said knobs being of different size with the smaller knob on said third means located within a cavity in the larger knob on said first means, (l) the cavity in said larger knob being provided with stops therein for abutment by said smaller knob to limit rotation of the smaller knob relative to the larger knob, and (m) both of said knobs being simultaneously moved during rotation of said first means and said smaller knob being movable independently of movement of said larger knob toward the stops in the cavity thereof whereby a user can manually adjust the previously preset factory calibration of the controller to change the cooking characteristics of said oven.

References Cited by the Examiner

UNITED STATES PATENTS

| 2,402,354 | 6/46 | Waddell | 219—486 |
| 2,441,192 | 5/48 | Graves | 219—489 X |

RICHARD M. WOOD, *Primary Examiner.*

MAX L. LEVY, *Examiner.*